(12) United States Patent
Croak et al.

(10) Patent No.: US 7,715,368 B1
(45) Date of Patent: May 11, 2010

(54) METHOD AND APPARATUS FOR DYNAMICALLY DEBITING A DONATION AMOUNT

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 292 days.

(21) Appl. No.: 11/261,964

(22) Filed: Oct. 28, 2005

(51) Int. Cl.
*H04L 12/66* (2006.01)

(52) U.S. Cl. ............... 370/352; 705/40; 379/201.02

(58) Field of Classification Search ............ 705/1, 705/39–40, 11; 379/201.02, 111–134; 370/352–356; 455/405–406
See application file for complete search history.

(56) References Cited

U.S. PATENT DOCUMENTS

| 6,029,151 A * | 2/2000 | Nikander ............ 705/39 |
| 2002/0087344 A1 * | 7/2002 | Billings et al. ............ 705/1 |

\* cited by examiner

*Primary Examiner*—Suhan Ni

(57) ABSTRACT

A method and apparatus for dynamically debiting a donation amount from an account in a communications network is described. In one embodiment, an interface associated with a network service bill used to allow a subscriber to designate the donation amount is provided to a customer. The data specifying the donation amount from said subscriber is then received by a dedicated application server. Afterwards, the donation amount is debited from the account associated with the network service bill.

17 Claims, 4 Drawing Sheets

METHOD AND APPARATUS FOR DYNAMICALLY DEBITING A DONATION AMOUNT

BACKGROUND OF THE INVENTION

1. Field of the Invention

Embodiments of the present invention generally relate to telecommunications systems and, more particularly, to a method and apparatus for dynamically debiting an donation amount in a communications network, such as a packet network, e.g., a voice over internet protocol (VoIP) network.

2. Description of the Related Art

Presently, many U.S. based enterprises and state governments are increasingly becoming more socially conscious. Notably, these entities are reaching out to the people they serve and are encouraging them to make donations to non-profit organizations. For example, many state tax forms request a taxpayer to donate a portion or percentage of the taxpayer's refunds to selected non-profit agencies. Similarly, some retailers will often non-obtrusively ask consumers to make a donation to selected charities at the retailers' point of sale locations at the time of purchase.

SUMMARY OF THE INVENTION

In one embodiment, a method and apparatus for dynamically debiting a donation amount from an account in a communications network is described. More specifically, an interface associated with a network service bill used to allow a subscriber to designate the donation amount is provided to a customer. The data specifying the donation amount from said subscriber is then received by a dedicated application server. Afterwards, the donation amount is debited from the account associated with the network service bill.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
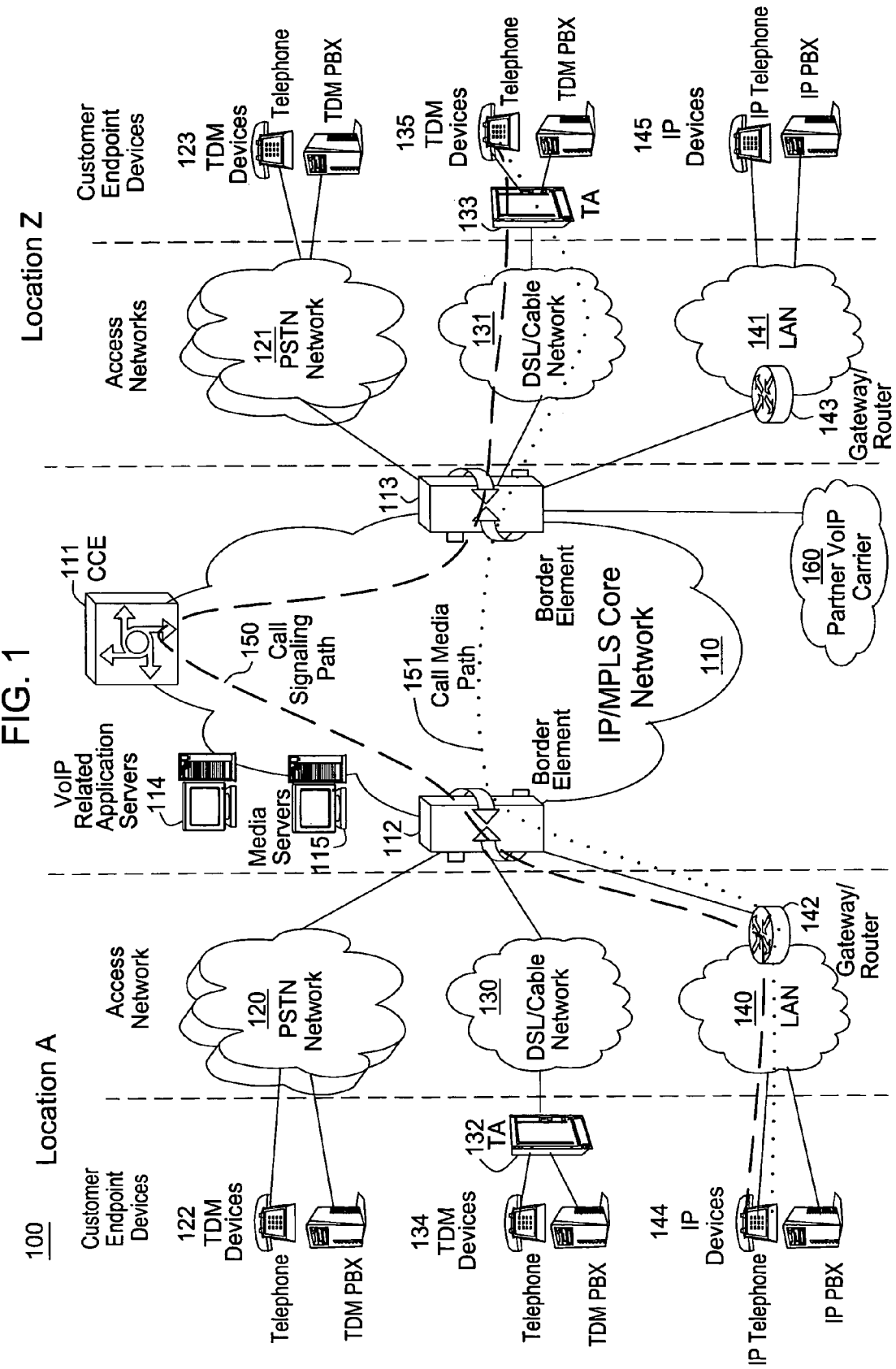
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The present invention enables a network service provider the ability to offer customers the opportunity to donate a prescribed amount (e.g., a percentage of their monthly charges) to a designated non-profit organization. The service provider subsequently distributes the donation amount to the prescribed charity on behalf of the consumer. This enables the provider to show good will and makes it more convenient for consumers to engage in a desired behavior that they may not have the time to do on their own.

Figure 2:
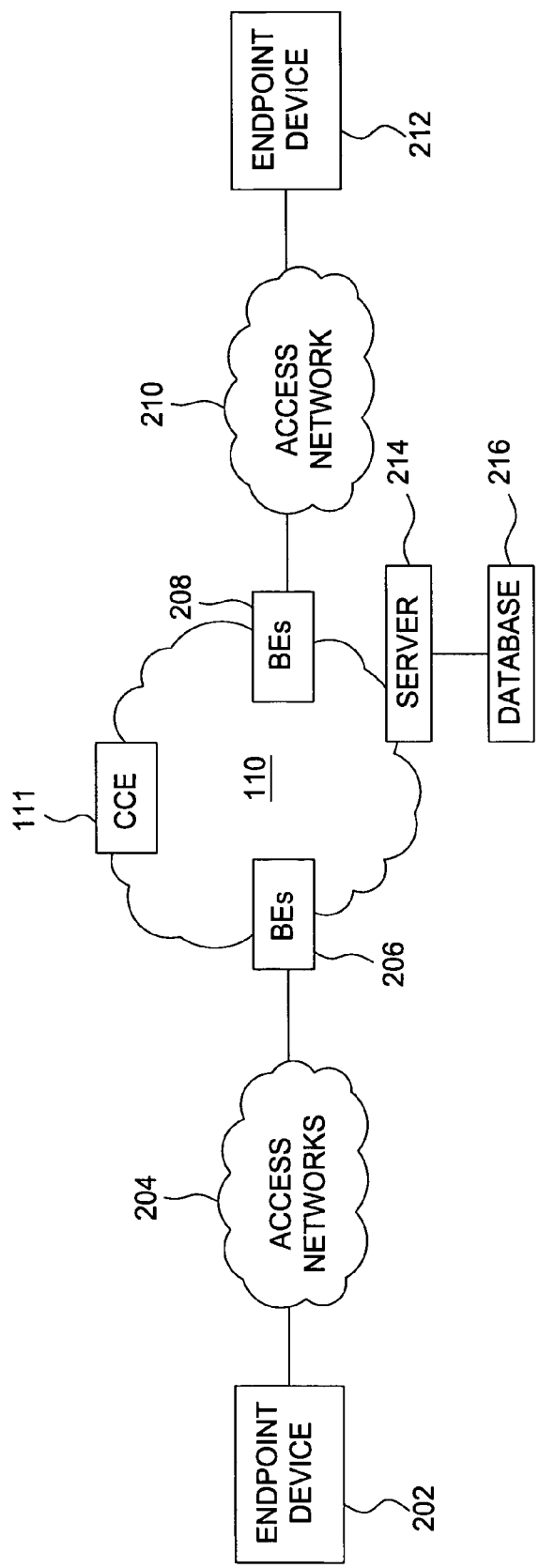
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and one or more border elements (BEs) 206. An endpoint device 212 is configured for communication with the core network 110 via an access network 210 and one or more BEs 208. The endpoint device 202 and the endpoint device 212 may comprise any of the customer endpoint devices described above (e.g., TDM devices, IP devices, etc.). The access networks 204 and 210 may comprise any of the access networks detailed above (e.g., PSTN, DSL/Cable, LAN, etc).

The core network 110 further includes a server 214 in communication with a database 216. In one embodiment of the present invention, the server 214 comprises a dedicated application server that is configured to support a user interface that enables a customer to conveniently donate to a predefined charity, non-profit organization, and the like in a dynamic manner. Notably, the user interface may comprise a web page designed to allow a customer to electronically pay a network service bill. However, the interface may also include a field that allows the customer to conveniently donate an amount to at least one charitable entity. The server 214 is also configured to store the donation data inputted by the customer into a database 216. The database 216 may be any type of electronic collection of data that is well known in the art. In one embodiment, the database 216 may be a common storage volume that contains donation amount information as well as the corresponding customer and associated account information (from which the donation will be debited).

In one embodiment of the present invention, a customer subscribing to network services is given the opportunity to electronically donate to at least one designated charitable entity by the service provider. More specifically, the service provider configures an interface associated with a network service bill (e.g., a web page designed for electronic bill payment) to provide a customer or registered subscriber the ability to donate a prescribed amount of money to a designated charity. The interface, which is supported by server 214, may be configured to receive instructions to subtract a prescribed amount from the customer's account (e.g., bank account, credit card account, line of credit account, etc.) on a one-time or periodic basis (e.g., monthly, quarterly, annual, etc.). In one embodiment, the interface may debit the amount from the same account used to pay the network service bill by default or from another account designated by the customer. Similarly, the donation amount designated by the customer may comprise an arbitrary sum or may be a percentage that is based on the amount of the customer's network service bill. The at least one charitable entity may be selected from a list of charities by the customer or may be predefined by the service provider. Notably, the server 214 is capable of maintaining an account record for a multitude of customers and stores this information in database 216. Once the donation amount is recorded in the database 216, the server 214 distributes the collected funds to the designated charitable institution(s).

Figure 3:
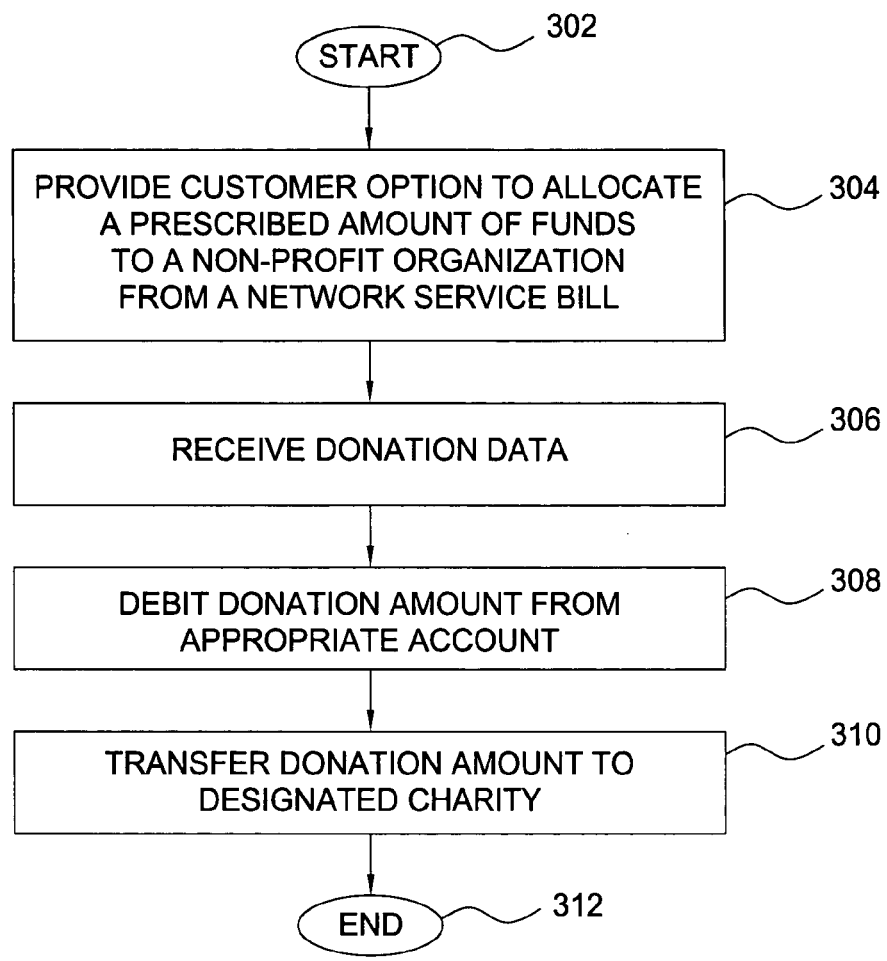
FIG. 3 is a flow diagram depicting an exemplary embodiment of a method for dynamically debiting a donation amount from an account in accordance with one or more aspects of the invention.

FIG. 3 is a flow diagram depicting an exemplary embodiment of a method 300 for dynamically debiting a donation amount in a communications network as related to one or more aspects of the invention. The method 300 begins at step 302 and proceeds to step 304 where a customer or subscriber to network services is provided the option to electronically donate a prescribed amount to a non-profit organization or charity. In one embodiment, a service provider configures the interface of an on-line bill paying application, such as a web page, to facilitate the donation process. Specifically, the customer is given the opportunity to donate an arbitrary set amount, or alternatively, an amount based on a percentage of the customer's network service bill (e.g., donate $10 if the service bill amount totals $100 and the customer opts to donate 10%). Similarly, the interface may provide the customer of the option of donating on a one-time or periodic basis. In another embodiment, the service provider may choose to award "points", which may ultimately be redeemed for a gift, a coupon, or complimentary network service to the donating customer in response for the customer's generosity. Similarly, the service provider may opt to match charitable gifts by the customers in order to compel or encourage donations to the charitable entities.

At step 306, the donation data is received. More specifically, the customer utilizes the interface and designates an amount to donate. This donation data is received by the server 214, which stores the information in the database 216 along with the customer's identity and account information.

At step 308, the donation amount is debited from the appropriate account. In one embodiment, the server 214 processes the donation by debiting the donation amount from an account designated by the donating customer. This account may be a checking account, a savings account, a credit card account, a line of credit account, a network service billing account, and the like. In one embodiment, the amount debited may be immediately transferred to an escrow-type account for future distribution to the charitably entity or the donation amount may be recorded with the customer's identity and payment account information in the database 216.

At step 310, the donation amount is sent to the designated charity. In one embodiment, the server 214 transfers the funds to the at least one designated charitable entity. Specifically, the server 214 may electronically transfer the funds from the database 216 to an account belonging to the non-profit organization or charity. The method 300 then ends at step 312.

Figure 4:
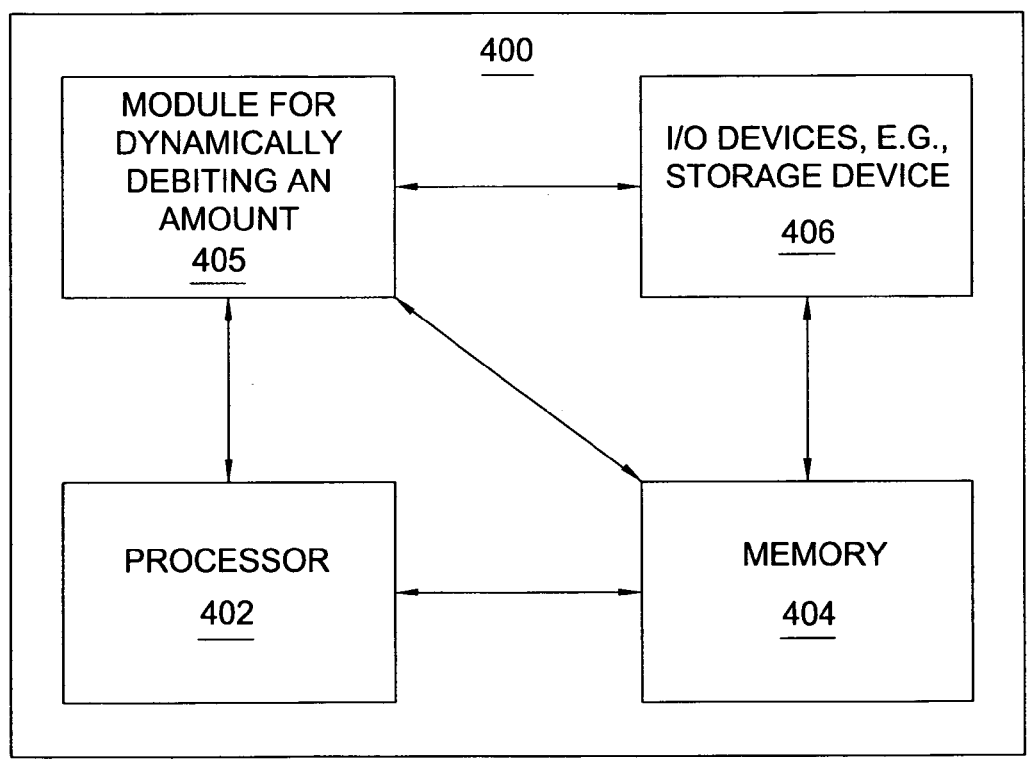
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for dynamically debiting a donation amount, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 405 for dynamically debiting a donation amount can be loaded into memory 404 and executed by processor 402 to implement the functions as discussed above. As such, the present process 405 for dynamically debiting a donation amount (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for dynamically debiting a donation amount from an account in a communications network, comprising:
   providing, via a service provider, an interface associated with a network service bill of said service provider to allow a subscriber to designate said donation amount and a customer account, wherein said donation amount comprises a percentage based on said network service bill;
   receiving data specifying said donation amount and said customer account from said subscriber; and
   debiting said donation amount from said customer account.

2. The method of claim 1, wherein said communications network comprises an Internet Protocol (IP) network.

3. The method of claim 2, wherein the IP network comprises at least one of: a Voice over IP (VoIP) network or a Service over IP (SoIP) network.

4. The method of claim 1, further comprising:
   transferring said donation amount to an account associated with at least one charitable entity.

5. The method of claim 1, wherein said debiting step is executed on a one-time basis.

6. The method of claim 1, wherein said debiting step is executed on a periodic basis.

7. An apparatus for dynamically debiting a donation amount from an account in a communications network, comprising:
   means for providing, via a service provider, an interface associated with a network service bill of said service provider to allow a subscriber to designate said donation amount and a customer account, wherein said donation amount comprises a percentage based on said network service bill;
   means for receiving data specifying said donation amount and said customer account from said subscriber; and
   means for debiting said donation amount from said customer account.

8. The apparatus of claim 7, wherein said communications network comprises an Internet Protocol (IP) network.

9. The apparatus of claim 8, wherein the IP network comprises at least one of: a Voice over IP (VoIP) network or a Service over IP (SoIP) network.

10. The apparatus of claim 7, further comprising:
    means for transferring said donation amount to an account associated with at least one charitable entity.

11. The apparatus of claim 7, wherein said means for debiting is executed on a periodic basis.

12. A computer-readable storage medium having stored thereon a plurality of instructions, the plurality of instructions including instructions which, when executed by a processor, cause the processor to perform the steps of a method for dynamically debiting a donation amount from an account in a communications network, comprising:
    providing, via a service provider, an interface associated with a network service bill of said service provider to allow a subscriber to designate said donation amount and a customer account, wherein said donation amount comprises a percentage based on said network service bill;
    receiving data specifying said donation amount and said customer account from said subscriber; and debiting said donation amount from said customer account.

13. The computer readable storage medium of claim 12, wherein said communications network comprises an Internet Protocol (IP) network.

14. The computer readable storage medium of claim 13, wherein the IP network comprises at least one of: a Voice over IP (VoIP) network or a Service over IP (SoIP) network.

15. The computer readable storage medium of claim 12, further comprising:

transferring said donation amount to an account associated with at least one charitable entity.

16. The computer readable storage medium of claim 12, wherein said debiting step is executed on a one-time basis.

17. The computer readable storage medium of claim 12, wherein said debiting step is executed on a periodic basis.

* * * * *